United States Patent [19]
Smoot

[11] Patent Number: 4,928,301
[45] Date of Patent: May 22, 1990

[54] TELECONFERENCING TERMINAL WITH CAMERA BEHIND DISPLAY SCREEN

[75] Inventor: Lanny S. Smoot, Morris Township, Morris County, N.J.

[73] Assignee: Bell Communications Research, Inc., Livingston, N.J.

[21] Appl. No.: 429,387

[22] Filed: Oct. 31, 1989

Related U.S. Application Data

[63] Continuation-in-part of Ser. No. 292,030, Dec. 30, 1988, abandoned.

[51] Int. Cl.⁵ .................. H04M 11/00; H04N 7/14
[52] U.S. Cl. ........................................ 379/53; 358/85
[58] Field of Search ............ 379/53; 558/85, 231, 558/236

[56] References Cited

U.S. PATENT DOCUMENTS 4,400,725 8/1983 Tanigaki ........................... 358/85
4,890,314 12/1989 Judd ................................. 379/53

FOREIGN PATENT DOCUMENTS 62-258574 11/1987 Japan.
63-102483 5/1988 Japan.

*Primary Examiner*—Keith E. George
*Attorney, Agent, or Firm*—James W. Falk

[57] ABSTRACT

A teleconferencing terminal which enables teleconference participants to communicate with eye contact is disclosed. The terminal alternates rapidly between an image capture mode and an image display mode. Illustratively, during operation in the image capture mode a front surface screen is made transparent and a video camera acquires a head-on image of a teleconference participant. During operation in the image display mode, the front surface screen is made translucent for display of a video image via rear projection. Preferably, operation in the image capture mode takes place during the vertical retrace interval of the image to be displayed.

11 Claims, 5 Drawing Sheets

| LINE A | VERTICAL RETRACE INTERVAL | INCOMING VIDEO FIELD DISPLAY INTERVAL | VERTICAL RETRACE INTERVAL | INCOMING VIDEO FIELD DISPLAY INTERVAL |
| --- | --- | --- | --- | --- |
| LINE B | IMAGE CAPTURE | OUTGOING VIDEO FIELD TRANSMISSION | IMAGE CAPTURE | OUTGOING VIDEO FIELD TRANSMISSION |
| LINE C | TRANS-PARENT | NON-TRANSPARENT | TRANS-PARENT | NON-TRANSPARENT |

TELECONFERENCING TERMINAL WITH CAMERA BEHIND DISPLAY SCREEN

RELATED APPLICATION

The present invention is a continuation-in-part of U.S. patent application Ser. No. 292,030 filed for Lanny S. Smoot on December 30, 1988 and assigned to the assignee hereof now abandoned.

FIELD OF THE INVENTION

The present invention relates to a teleconferencing terminal which enables communicating parties to have eye contact with each other.

BACKGROUND OF THE INVENTION

Face-to-face conversation is universally recognized as the preferred form of human communication. For decades this fact has been the impetus for the development of video teleconferencing systems. In a typical teleconferencing system, a pair of terminals, each with a video camera and a video display device, a microphone and a speaker, are connected by a telecommunications link to permit face-to-face communications at a distance.

However, such systems as have been developed to date have failed to address the fact that communication is best when video conference participants have eye contact with each other.

In a typical teleconferencing terminal, the video camera and the video display device are not in line with one another, but are so disposed that a communicant in a teleconference has the choice of facing the camera and not directly facing the display device or—the usual choice—facing the display device, with the result that the camera captures a face seemingly staring off into space, no eye contact then being possible with the other communicant in the teleconference.

One prior art attempt to alleviate this problem has been to place within a teleconferencing terminal a half-silvered mirror with a camera behind it and the display device off to one side. In this case, the image from the display device is reflected by the half-silvered mirror toward the local communicant while the camera scans the local communicant head-on through the half-silvered mirror, thus providing eye contact with the remote communicant. One problem with this terminal arrangement is that the video display device no longer offers a front-surface view, but an image recessed into the terminal. The loss of the sense of immediacy, of presence, is felt at once, vitiating much of the eye-contact gain that was the aim of the design.

This half-silvered mirror arrangement, often used for teleprompting, is a purely mechanical one—a half-silvered mirror in a box—at which both the video camera and the video display are pointed. The camera and the display work independently of each other, no attempt being made to coordinate their operation.

In view of the shortcomings of the above-described conventional teleconferencing terminals, it is an object of the present invention to provide a teleconferencing terminal which enables communicating parties to have eye contact with each other, and enjoy a heightened sense of each other's presence, with improved image quality.

SUMMARY OF THE INVENTION

The present invention is a teleconferencing terminal which enables communicants in a teleconference to have eye contact with one another. In an illustrative embodiment of the invention, a teleconferencing terminal includes a video projection source for presentation to a local communicant of an image of a remote communicant, and a video camera to capture an image of the local communicant for transmission to a remote terminal for display to a remote communicant. The terminal incorporates a half-silvered mirror. This mirror serves to reflect radiation generated by the video projection source onto the rear surface of a translucent front viewing screen to form a video image of the remote communicant. Illustratively, the front viewing screen is a liquid-crystal screen. The liquid crystal screen has the property that it can be rapidly switched from a transparent state to a scattering or translucent state by the application of a suitable control voltage.

The terminal of the present invention operates in an image display mode and an image capture mode. During operation in the image display mode, the liquid crystal screen is made to be translucent so that it serves as a rear-projection screen to display a video image formed from radiation generated by the video projection source and reflected off the half-silvered mirror.

During operation in the image capture mode, the liquid crystal screen is made transparent. The video camera in the terminal is positioned so that it views its local communicant head-on, directly through the (now transparent) liquid crystal screen, ensuring eye contact.

The terminal operates alternately in the image capture mode and the image display mode. The operation of the video projection source, the video camera and the liquid crystal screen is synchronized to switch between the image capture mode and the image display mode. Thus, during operation in the image capture mode, the video camera's image capture circuitry is turned on and the liquid crystal screen is made transparent. During operation in the video image display mode, the liquid crystal screen is made translucent for display via rear projection of a video image and the video camera's image capture circuitry is disabled. Preferably, operation in the image capture mode takes place during the vertical retrace interval of the video image to be displayed. In this manner, each teleconference participant receives a head-on view of the other teleconference participant with eye contact.

The alternation between the image capture mode and the image display mode may be more clearly understood as follows. In a video system based on the National Television Standards Committee (NTSC) transmission format, a first field of video imagery to be displayed comprises some 245 lines of active video scanned, line-by-line, from the top of the display screen to the bottom of the display screen in just under 1/60 second. When the scan is completed, the scan returns to the top of the screen, but displaced horizontally by one-half line, to commence the display of a second field of video imagery, interleaved with the first field of video imagery, the two fields comprising what is known as a frame of video imagery. The return to the top of the screen is known as the vertical retrace interval. It typically comprises some 17.5 scan lines and occupies at least one thousandth of a second. The vertical retrace interval plus its associated field scan interval together last for exactly 1/60 second in the NTSC transmission format. The terminal of the present invention operates in the image capture mode during each vertical retrace interval and otherwise operates in the image display mode.

Operation in the image capture mode during the vertical retrace interval makes use of modern video cameras such as the so-called high-speed shutter electronic CCD video cameras. Such video cameras have image capture circuitry which is sufficiently fast to capture an image in less than one-thousandth of a second. For operation in the image capture mode, the video camera's capture circuitry is switched on at the beginning of the vertical retrace interval of the video signal arriving from the remote communicant when the local terminal has no video imagery to display. Simultaneously, the terminal's liquid crystal screen is switched from a translucent, image display state to a transparent state. The video camera captures a head-on image of its local communicant through the now-transparent screen during a brief glimpse coincident with the vertical retrace interval of the arriving video signal. At the completion of the vertical retrace interval, in order to switch to operation in the image display mode, the camera's image-capture circuitry is switched off and the liquid crystal screen is returned to a translucent, image display state in order to enable the display of the next field of video imagery that is being received from the remote communicant. Simultaneously with the display of an arriving field of video imagery, the terminal's video camera also scans out, line-by-line, for transmission to the remote terminal, the video image field it has captured in the directly preceding vertical retrace interval.

In the above-described manner, the operation of the terminal's camera and display are synchronized to be non-interfering: whenever a field of remote video imagery is being received from the remote terminal and is being displayed, a field of local video imagery, captured by the local camera, is being transmitted to the remote terminal for display there. The local camera's only glimpse of the local communicant comes during the vertical retrace interval, when no video is being displayed.

The disposition of each terminal's camera to effectively view the local communicant directly through the display screen ensures eye contact between the communicating parties.

DETAILED DESCRIPTION OF THE INVENTION

Figure 1:
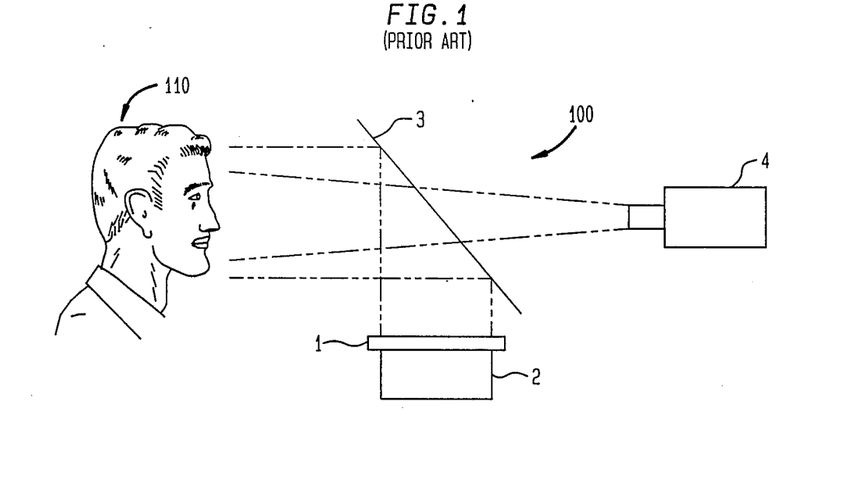
FIG. 1 schematically illustrates one terminal of a prior art teleconferencing system, its remote counterpart not being shown.

Turning to FIG. 1, a local communicant 110 is shown facing a prior art terminal 100 that uses an arrangement of components similar to that used for teleprompting purposes.

The terminal 100 comprises a video image display device 2 with a viewing surface 1, a half-silvered mirror 3, and a video camera 4. The purpose of the video camera 4 is to capture an image of the local communicant 110 for transmission to a remote terminal (not shown) where it can be displayed to a remote communicant located there. The purpose of the video image display device 2 is to display to the local communicant 110 the image of the remote communicant captured by a video camera in the remote terminal, and thence transmitted to the local terminal 100.

The half-silvered mirror 3 serves to reflect to the local communicant 110 the image of the remote communicant displayed on the surface 1 of the display device 2, while, at the same time, permitting the video camera 4 to see through it, capturing the image of the local communicant 110 for transmission to the remote terminal where it may be displayed.

Note that this is a purely mechanical arrangement, with no synchronization between the video camera 4 and the video display 2. Both are on simultaneously and operate independently of each other. Note that the displayed image lacks "presence"—a sense of realism—since it appears to be significantly recessed into terminal 100, a dim and somewhat remote presentation. A further disadvantage of a recessed display is that it is unacceptable for certain specialized accessories to a video terminal such as a light pen which requires a front surface display.

Figure 2A:
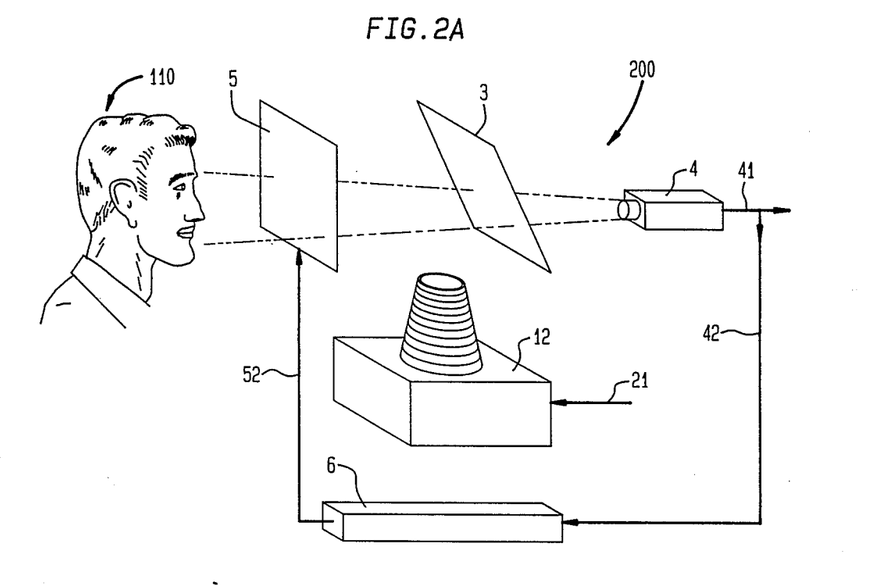
FIG. 2A schematically illustrates a teleconferencing terminal operating in its image capture mode in accordance with an illustrative embodiment of the present invention.

FIG. 2A shows a local communicant 110 facing a terminal 200 in accordance with the present invention. The terminal 200 comprises a liquid crystal rear projection screen 5, a video image projection device 12, a video camera 4, a half-silvered mirror 3, a control unit 6, composite video output lines 41 and 42, composite video input line 21, and synchronization and control line 52. The liquid crystal screen 5 can be switched between a transparent state and a translucent image display state by application of a suitable voltage via line 52. Illustratively, the liquid crystal screen 5 is formed from an encapsulated nematic liquid crystal material. The video camera 4 is illustratively a CCD camera with a high speed shutter. The shutter operates at speeds so as to achieve 1/1000 sec exposures. The 1/1000 sec exposure time is less than or equal to the vertical retrace interval of the projection device 12. In addition, the video camera 4 may have a feature such that its image capture and readout modes are triggered synchronously with an external video signal. This feature is known commercially as "genlock".

In FIG. 2A, the terminal 200 is shown operating in its imagecapture mode. The liquid crystal screen 5 is set in its transparent state by the control unit 6 through the control line 52, affording video camera 4 a clear head-on view of local communicant 110 through half-silvered mirror 3. Video image projection device 12 is in its vertical retrace interval so there is no video image to display.

In FIG. 2A, video camera 4 is capturing an image of local communicant 110, so, as yet, no video of that image is being transmitted to the remote terminal through outgoing composite video lines 41 and 42.

Figure 2B:
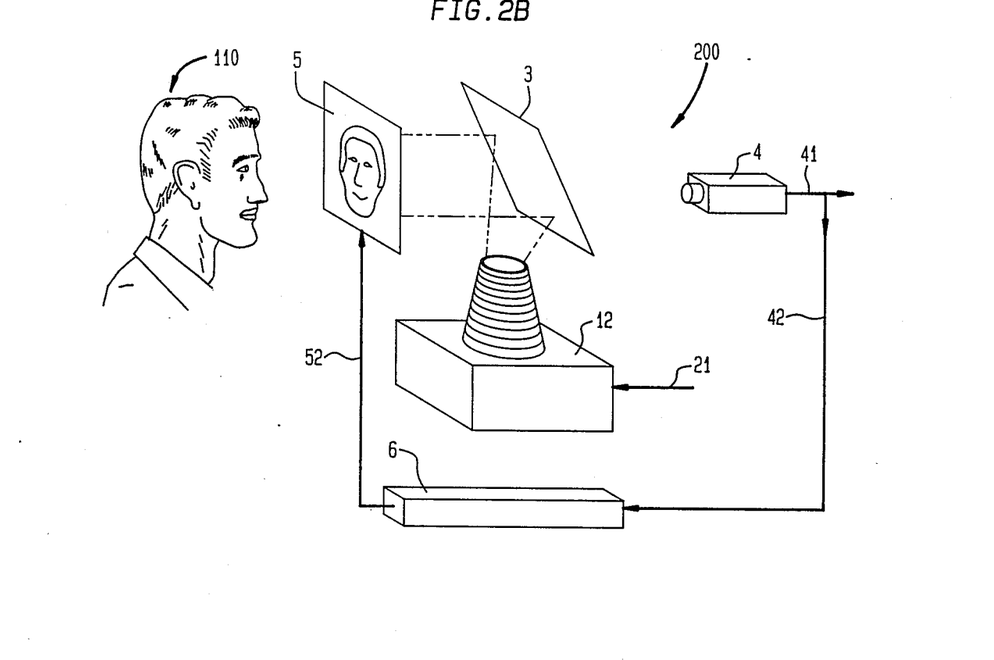
FIG. 2B schematically illustrates a teleconferencing terminal operating in its image display mode in accordance with an illustrative embodiment of the present invention.

FIG. 2B again shows terminal 200, but now operating in its image-display mode. In FIG. 2B, the projection device 12 is now projecting an image of a remote communicant that has been received from the remote terminal on incoming video signal line 21 as a composite video signal, i.e. including the synchronization signals needed for its reconstruction and display. The image is formed by reflecting radiation generated by the projection device 12 off of the half-silvered mirror 3 to form a rear projection image on the rear surface of the liquid crystal screen 5 which is now set to a translucent state by control unit 6 through control line 52.

Video camera 4 now has its image capture circuitry switched off, so it no longer views local communicant 110, but instead outputs a field of video formed from the previously captured image of the communicant 110 on line 41, for transmission to the remote terminal. This video signal is also transmitted via line 42 to the control circuit 6 which transmits control signals to the liquid crystal screen 5 via control line 52 so that the liquid crystal screen 5 is transparent when the terminal 200 is in the image capture mode and translucent when the terminal 200 is in the image display mode.

Figure 3:
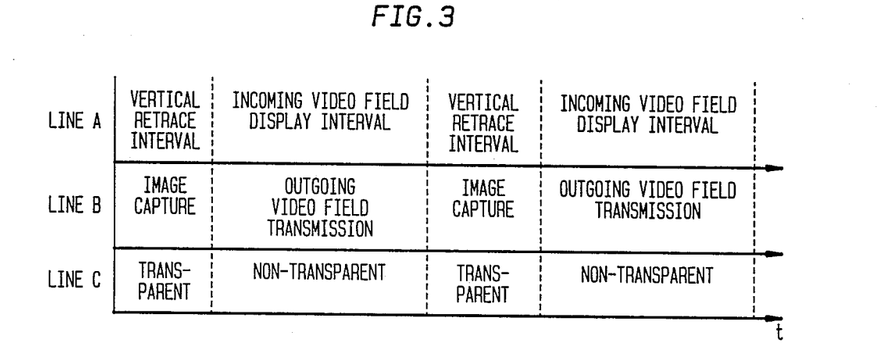
FIG. 3 shows a system timing diagram that illustrates the operation of a terminal of the present invention in terms of the sequence of video image capture, video image transmission and video display functions.

FIG. 3, lines A, B and C are timing diagrams for the video projection device 12, the video camera 4, and the liquid crystal screen 5, respectively, of the terminal 200 of FIG. 2A and 2B. Thus, line A of FIG. 3 shows that the video projection device 12 receives and displays successive fields of video images, which successive fields are separated by a vertical retrace interval. Line B of FIG. 3 shows that the video camera 4 captures its image while the projection device 12 is in its vertical retrace interval. In particular, during each vertical retrace interval of the projection device 12, the video camera 4 captures one field of video. Line B also shows that the captured field of video is scanned out by the camera 4 for remote transmission, while the projection device 12 is scanning the display screen to display a field of incoming video. Line C of FIG. 3 shows that the liquid crystal screen 5 is transparent during the vertical retrace interval of the video projection device 12 which is simultaneous with image capture by the camera 4. Line C also shows that the screen 5 is translucent when a field of incoming video is being displayed. To insure synchronization between the local terminal and the remote terminal, frame store buffers may be utilized for incoming video frames. Such buffers may be utilized if the image capture and image display operations of the remote and local terminals are not quite synchronized with one another.

When operated in the above-described manner, the terminal 200 switches between its image display mode and its image capture mode so rapidly, that the local communicant 110 is provided with a flicker free image of the remote communicant, while at the same time, the camera 4 acquires a head-on image of the local communicant 110 for transmission to the remote communicant. Thus, when terminals of the type 200 are utilized in a teleconferencing system, both the remote and local communicants have eye contact with each other.

Figure 4:
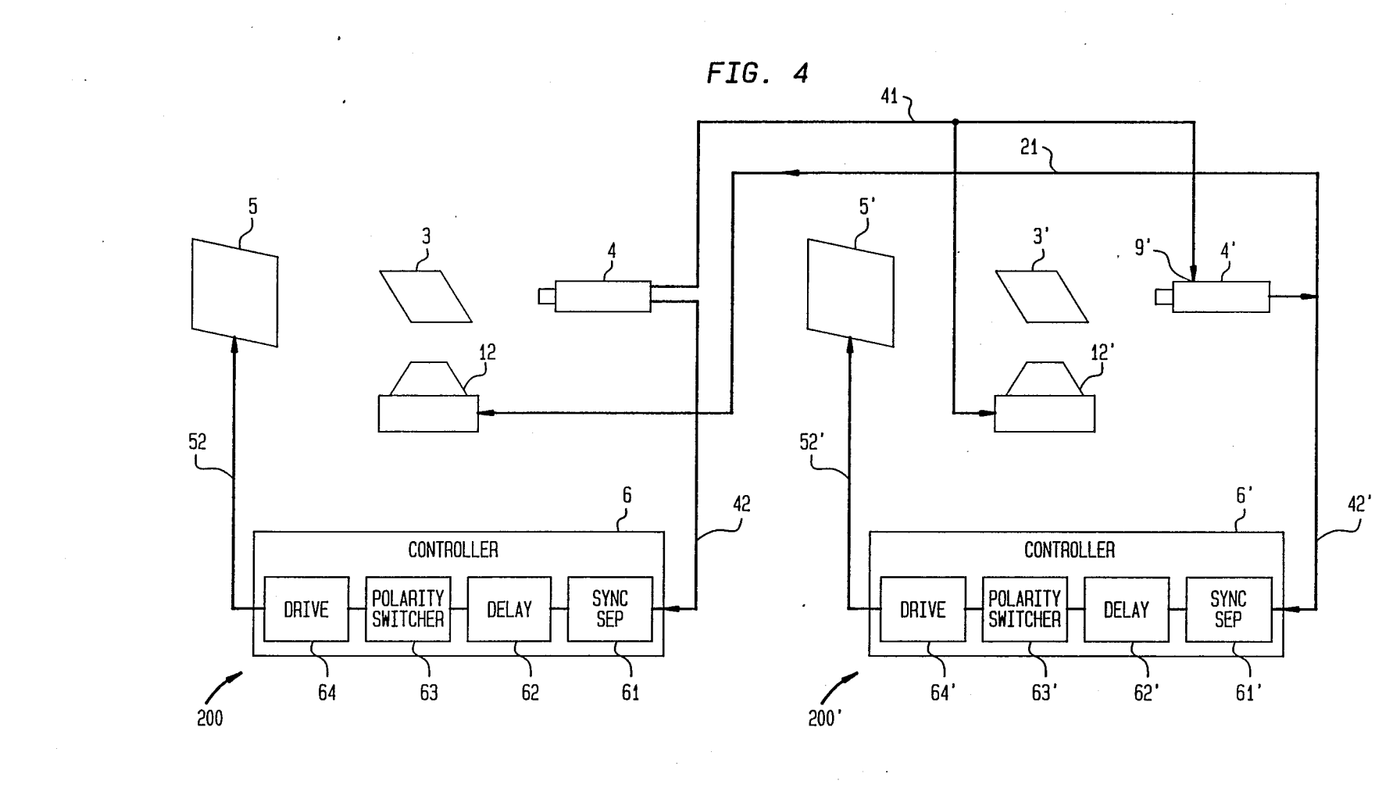
FIG. 4 schematically illustrates two teleconferencing terminals of the type shown in FIGS. 2A and 2B which are in communication with each other.

FIG. 4 shows two teleconferencing terminals of the type shown in FIGS. 2A and 2B in communication with one another. Thus, in FIG. 4 the teleconferencing terminal 200 comprises the mirror 3, the video camera 4, the liquid crystal display screen 5, the video projector 12 and the control circuit 6. Similarly, the teleconferencing terminal 200' comprises the mirror 3', the video camera 4', the liquid crystal display screen 5', the video projector 12' and control circuit 6'.

For synchronization purposes, the terminal 200 serves as a master terminal. In this case, the video camera 4 serves as a master camera which is allowed to run freely. Thus the camera 4 illustratively generates a 1/1000 second exposure of objects in front of it every 1/60 second. The recorded image information is transmitted to the remote terminal 200' via the line 41 and to the local controller 6 via the line 42. In response to the information received via line 42, the circuitry in the controller 6 transmits control signals via line 52 to render the liquid crystal screen 5 transparent during the 1/1000 second intervals when the video camera 4 is capturing an image and translucent otherwise.

At the remote terminal 200', the video signal produced by the camera 4 is received at the projector 12' and at a locking input 9' of the camera 4'. The projector 12' serves to project the video image received from the camera 4 off of the mirror 3' and onto the rear surface of the screen 5' when the screen 5' is translucent. The input 9' of the camera 4' activates a "genlock" feature so that operation of the camera 4' is synchronized with the video signal produced by the camera 4. The video output of the camera 4' is transmitted to the projector 12 via the line 21 and to the controller 6' via the line 42'. The controller 6' transmits control signals via the line 52' to the screen 5' so that the screen 5' is translucent when the projector 12' receives a field of video from the camera 4 and is transparent when the projector 12' is in its vertical retrace interval and the camera 4' is generating a 1/1000 sec exposure of object in front of it. Thus, the cameras 4 and 4' and projectors 12 and 12' are synchronized such that the projectors 12 and 12' have substantially simultaneous vertical retrace intervals and the video cameras 4 and 4' have substantially simultaneous image capture intervals. To insure synchronization a buffer (not shown) with a storage capacity of up to a frame of video may be interposed in the line 21 or the line 41.

The control circuits 6 and 6' are now considered. As shown in FIG. 4, the control circuit 6 comprises a sync separator 61, a delay circuit 62, a polarity switcher 63, and an output drive circuit 64. Similarly, the control circuit 6' comprises a sync separator 61', a delay circuit 62', a polarity switcher 63' and an output drive circuit 64'.

Figure 5:
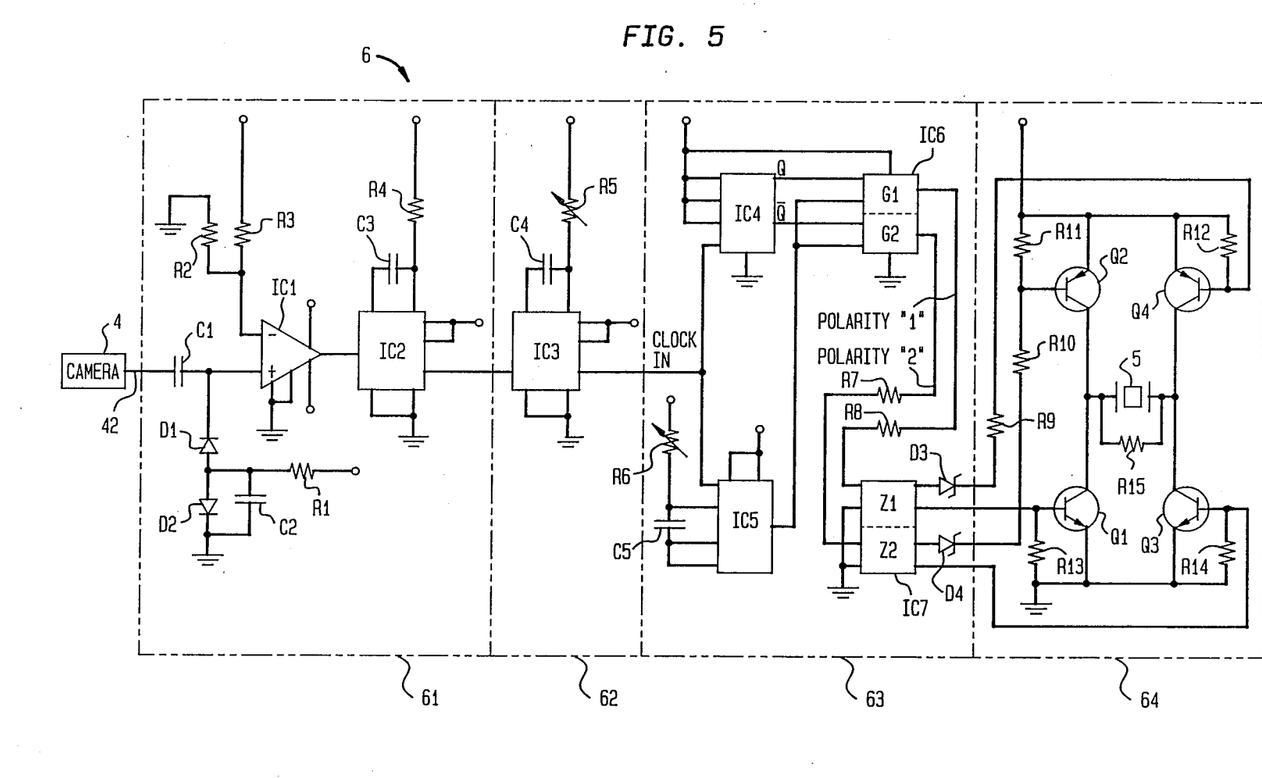
FIG. 5 schematically illustrates a control circuit for use in the teleconferencing terminal of FIGS. 2A and 2B.

The control circuit 6 is shown in more detail in FIG. 5. As shown in FIG. 5, a sync separator 61 derives a sync signal which corresponds to the vertical sync interval of the incoming video signal on line 42 from camera 4. This is accomplished by ac coupling the camera video signal on line 42 through input capacitor C1. Diodes D1 and D2, filter capacitor C2 and bias resistor R1 form a peak-clamp circuit which clamps the negative excursion of the incoming composite video signal to ground potential. A threshold-setting resistive voltage divider comprised of R2 and R3 sets a threshold voltage which is applied to the reference input of high speed comparator IC1. This threshold voltage is set so that IC1 triggers each time a vertical or horizontal sync pulse arrives. The output of IC1 comprises a pulse signal corresponding to the horizontal and vertical sync pulses of the incoming video signal. This signal is applied to IC2 which is a one-shot circuit whose time constant is determined by R4 and C3. These components determine a time constant which is sufficiently long such that IC2 is repeatedly retriggered by the incoming horizontal sync pulses but which will cause the one-shot output to drop out during the vertical field synchronizing interval. In this manner the output of IC2 is made to correspond to the arrival of the incoming vertical synchronizing pulses.

This timing information is applied to one-shot IC3 of delay circuit 62. The one-shot IC3 has an adjustable delay time which is determined by C4 and R5. This state serves as an adjustable delay device to shift the relative phase of the incoming video sync pulses and to apply these pulses to the polarity switching circuit 63 responsible for ultimately driving the liquid crystal output drive circuit 64. The phase-adjusted pulses produced by the delay circuit 62 are applied to toggle flip-flop IC4 and output pulse length control one-shot IC5. One-shot circuit IC5, with a time constant determined by R6 and C5, generates pulses of adjustable length which are applied to the pulse routing circuit IC6. The circuit IC6 comprises two AND gates G1 and G2, one having an input from the "Q" output of IC4 and one having an input from the inverse "Q" output of IC4. In this manner IC6 routes "high" pulses of length determined by one-shot IC5 alternately to one of its two output leads "polarity 1" and "polarity 2". IC7 comprises two independent opto-couplers Z1 and Z2. When alternately activated by the "polarity 1" and "polarity 2" outputs of IC6 via R8 and R7, respectively, opto-couplers Z1 and Z2 alternately apply base drive signals to high voltage driver transistors Q1, Q4, and Q2, Q3. This is done through current limiting components: zener diode D3 and R9 for "polarity 1" and through analogous components D4 and R10 for "polarity 2". Resistors R11, R12, R13, and R14 serve to remove stored base charge from Q2, Q4, Q1 and Q3, respectively, when base drive is removed from these devices. R15 serves to remove stored charge from the liquid crystal screen 5 during the interval when it is in its non-energized state.

In this manner, during alternate vertical retrace intervals the pairs Q2, Q3 and Q1, Q4 are alternately turned on with a duration determined by IC5's pulse duration. This insures that there is no net Dc voltage applied to the screen 5.

Figure 6:
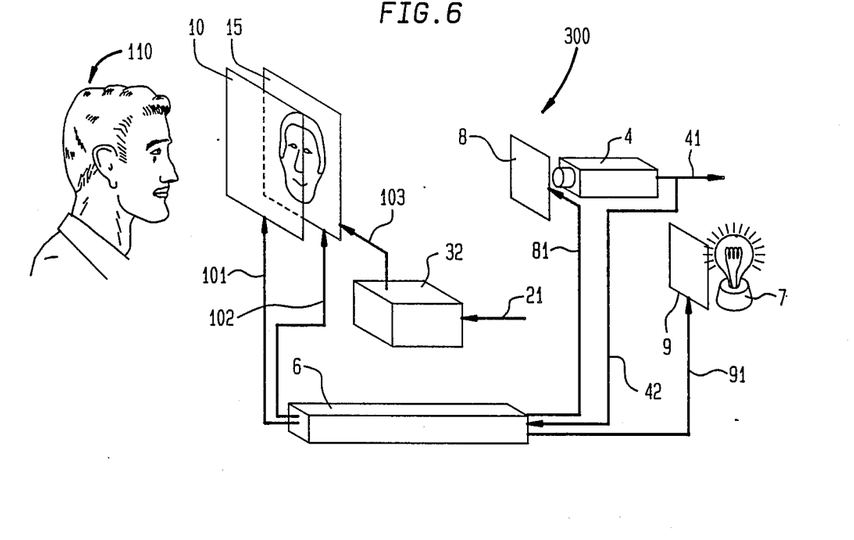
FIG. 6 schematically illustrates a teleconferencing terminal in accordance with an alternative embodiment of the present invention.

FIG. 6 illustrates an alternative teleconferencing terminal in accordance with the present invention. Like elements in FIG. 2A and 2B and FIG. 6 have the same identifying numerals. The terminal 300 of FIG. 6 is in its image display mode.

The terminal 300 of FIG. 6 comprises a liquid crystal display screen 15, used for the actual display of a video image during operation in the image display mode, a liquid crystal screen 10 positioned in front of liquid crystal display screen 15, and used as a diffuser screen, liquid crystal screens 8 and 9, used as shutters, a video camera 4, a video image receiving system 32 that uses liquid crystal display screen 15 as its display element, light source 7, used to back-light liquid crystal display 15, incoming composite video signal line 21, outgoing composite video signal lines 41 and 42, control unit 6, and synchronization and control lines 81, 91, 101 and 102. The control unit 6 receives video information from the camera 4 via line 42 and communicates liquid crystal state control voltages through control lines 81, 91, 101 and 102.

When the terminal 300 of FIG. 6 is in the image display mode, the video image receiving system 32 displays the incoming image of the remote communicant directly on the liquid crystal display screen 15, thereby eliminating use of the half-silvered mirror 3 of FIGS. 2A and 2B. Thus, the liquid crystal display screen 15 comprises an array of separately addressable pixels, each of which can be made transparent or of controllable transmissivity by the application of suitable control voltages to state control wires (not shown) embedded in the liquid crystal display screen 15. The state control wires cross each other in an X-Y grid pattern. To display an image on screen 15, the control voltages for the individual pixels are supplied by the video receiving system 32 via the line 103. For operation in the image capture mode, the screen 15 can be made transparent under control of the control unit 6 by the application of suitable control voltage transmitted via line 102. The screen 10 is switched as a whole between transparent and translucent states via the control line 101 during the image capture and image display modes respectively.

A liquid crystal display screen such as screen 15 produces no light of its own, so liquid crystal screen 15 is illuminated from the rear by light source 7, producing a bright, high-contrast image that retains excellent quality even when viewed under conditions of high ambient light.

The diffuser screen 10 is here shown in a translucent state achieved by control unit 6 through its application of a state control voltage to control line 101 during operation in the image-display mode, thus serving to spread the image of each of the pixels of the image display screen 15, which would otherwise appear as tiny image points near the activated regions of the state-control-wire crossings (not shown). Light source 7 is positioned so that it illuminates liquid crystal display screen 15 but so that its light cannot be directly observed by video camera 4. Similarly, to prevent the backscatter of light from light source 7 to the video camera 4, the terminal 300 is contained in a housing (not shown) whose interior is non-reflective.

Despite the fact that the position of light source 7 keeps its rays from directly entering the lens of video camera 4 where they might saturate the sensor array of video camera 4 and wash out its image of local communicant 110, and despite the option of using an antireflective coating on the rear surface of the screen 15, the incidental backscatter of that light from the rear surface of screen 15 may still prove troublesome. To overcome this, both the video camera 4 and the light source 7 are here shown provided with optional liquid crystal shutters 8 and 9 respectively. During the image-display mode as shown in FIG. 6, shutter 8 is kept opaque and shutter 9 is kept transparent by control unit 6, through its application of state control voltages to control lines 81 and 91, respectively, of the terminal 300. However, during the display vertical-retrace interval (i.e. during the image capture mode), when the screens 15 and 10 are made transparent and video camera 4 is permitted its brief glimpse of the local communicant, the states of the shutters 8 and 9 are reversed by control unit 6, video camera 4's shutter 8 being switched to transparent and light source 7's shutter 9, being switched to opaque. At the same time, the normally translucent diffuser screen 10 and the display screen 5 are switched to their transparent states under control of the unit 6 via lines 101 and 102. In this case, the now opaque shutter 9 prevents the local communicant 110 from seeing a flash of the light source 7.

This prevents any flooding of the camera with interfering light, whether direct or reflected, and permits the use of inexpensive, long-lived incandescent, electroluminescent or similar light sources rather than lights that would have to be rapidly switched off during the brief interval when the video camera is switched on to capture its image of the viewer.

Note that the use of the liquid crystal display 15 as a display screen permits the terminal to be smaller and more compact, for any desired image size, and also permits the display of a bright, high-contrast image, viewable in high ambient light, since the separate light source 7 rather than the display device itself, provides the image brightness.

Finally, the above-described embodiments of the invention are intended to be illustrative only. Numerous alternative embodiments may be devised without departing from the spirit and scope of the present invention.

What is claimed is:

1. A teleconferencing terminal which enables communicants to have eye contact during a teleconference, said terminal comprising
   a screen which can be switched between a transparent state and an image display state,
   a video camera including image capture circuitry positioned behind said screen,
   means for receiving a composite video signal comprising successive video fields, and
   a control unit in communication with said screen for applying control signals to said screen so that said screen is alternately in said transparent state during which said image capture circuitry of said video camera is activated and in said image display state during which one of said video fields is displayed, wherein said means for receiving said video signal comprises projection means for projecting a video image onto a rear surface of said screen when said screen is in said image display state.

2. A teleconferencing terminal which enables communicants to have eye contact during a teleconference, said terminal comprising
   a screen which can be switched between a transparent state and an image display state,
   a video camera including image capture circuitry positioned behind said screen,
   means for receiving a composite video signal comprising successive video fields, and
   a control unit in communication with said screen for applying control signals to said screen so that said screen is alternately in said transparent state during which said image capture circuitry of said video camera is activated and in said image display state during which one of said video fields is displayed, wherein said successive video fields are separated by vertical retrace intervals, and wherein said screen is in said transparent state during said vertical retrace intervals.

3. The device of claim 2 wherein said video camera scans out a captured image field for remote transmission simultaneously with the display of the video field received immediately following the retrace interval in which the image field was captured.

4. A teleconferencing terminal comprising a screen capable of being switched between a transparent state and an image display state, a video camera located directly behind said screen, means for receiving a remotely generated video signal, and control means for causing said screen to alternate between said transparent state when said video camera is activated to capture an image through said screen and said image display state when an image field of said video signal received by said receiving means is displayed on said screen, wherein said screen is maintained in said transparent state and said video camera is activated to capture an image during a vertical retrace interval of said video signal.

5. A method for operating a teleconferencing terminal comprising a screen, a video camera located directly behind the screen, and means for receiving a video signal, said method comprising the steps of
   applying control signals to said screen to alternate said terminal between an image capture mode wherein said screen is switched to a first, transparent state and said video camera is activated to capture an image through said screen and an image display mode wherein said screen is switched to a second state for display of an image field of a video signal received by said receiving means, wherein in said second state said screen is translucent.

6. A teleconferencing terminal which enables a communicant at the terminal to have eye contact with a remote communicant during a teleconference and comprising
   a switchable optical display screen which can be switched between a transparent state and a translucent state and to one side of which the communicant is located during the teleconference,
   video camera means for capturing an image of the communicant when said screen is in its transparent state, said camera being located to the other side of said screen,
   means for displaying a video signal comprising the image of a remote communicant on said optical display screen when said screen is in its translucent state, and
   control means for switching said display screen between its transparent and translucent states.

7. A teleconferencing terminal in accordance with claim 6 wherein said display screen is a liquid crystal display screen.

8. A teleconferencing terminal in accordance with claim 6 wherein said displaying means includes a video signal receiver and projection means for projecting the received image onto a rear surface of said display screen.

9. A teleconferencing terminal in accordance with claim 6 wherein said displaying means includes a video signal receiver and a further switchable optical display screen electrically connected to said signal receiver for displaying the received image.

10. A teleconferencing terminal in accordance with claim 9 further comprising light source means for illuminating said further switchable optical display screen and shutter screen means for blocking said light source means when said first mentioned optical display screen is in its transparent state.

11. A teleconferencing terminal in accordance with claim 10 further comprising a second shutter screen means for blocking said camera when said camera is not capturing an image and which is transparent when said camera is capturing an image.

* * * * *